United States Patent
Broker et al.

(10) Patent No.: US 11,668,382 B2
(45) Date of Patent: Jun. 6, 2023

(54) DIFFERENTIAL OVERMOLDED WELDABLE RING

(71) Applicant: METALDYNE, LLC, Plymouth, MI (US)

(72) Inventors: Nathan Fredrick Broker, Plymouth, MI (US); Carl A. Koerschner, Ann Arbor, MI (US); Adam Turner, Novi, MI (US); Hosam Z. Abdu, Livonia, MI (US); Charles V. Rupert, II, Rochester Hills, MI (US); Cory J. Padfield, Royal Oak, MI (US)

(73) Assignee: METALDYNE, LLC, Detroit, MI (US)

( * ) Notice: Subject to any disclaimer, the term of this patent is extended or adjusted under 35 U.S.C. 154(b) by 0 days.

(21) Appl. No.: 17/843,183

(22) Filed: Jun. 17, 2022

(65) Prior Publication Data
US 2022/0316572 A1    Oct. 6, 2022

Related U.S. Application Data

(63) Continuation of application No. 16/311,848, filed as application No. PCT/US2017/039224 on Jun. 26, 2017, now abandoned.
(Continued)

(51) Int. Cl.
| | |
|---|---|
| *F16H 48/40* | (2012.01) |
| *F16H 55/06* | (2006.01) |
| *F16H 55/22* | (2006.01) |
| *F16H 57/032* | (2012.01) |
| *F16H 57/12* | (2006.01) |

(Continued)

(52) U.S. Cl.
CPC .............. *F16H 48/40* (2013.01); *F16H 55/06* (2013.01); *F16H 55/22* (2013.01); *F16H 57/02* (2013.01); *F16H 57/032* (2013.01); *F16H 57/12* (2013.01); *F16H 2048/385* (2013.01)

(58) Field of Classification Search
CPC .......... F16H 48/40; F16H 55/06; F16H 55/22; F16H 57/02; F16H 57/032; F16H 57/12; F16H 2048/385
See application file for complete search history.

(56) References Cited

U.S. PATENT DOCUMENTS

| | | |
|---|---|---|
| 6,308,882 B1 | 10/2001 | Shuster et al. |
| 6,378,761 B2 | 4/2002 | Eulenstein et al. |

(Continued)

FOREIGN PATENT DOCUMENTS

| | | |
|---|---|---|
| CN | 102802992 A | 11/2012 |
| DE | 102006062200 A1 | 6/2008 |

(Continued)

OTHER PUBLICATIONS

EPO machine translation of KR 20110122738 A, Norihiro, Oct. 11, 2011 (Year: 2011).*

(Continued)

*Primary Examiner* — Vinh Luong
(74) *Attorney, Agent, or Firm* — McDonalds Hopkins LLC

(57) ABSTRACT

A differential assembly is disclosed herein. The differential assembly includes a case, a weld ring and a ring gear. The ring gear and case may comprise dissimilar materials. The case may be overmolded onto the weld ring. The weld ring may be welded to the ring gear such that the ring gear is attached to the case.

31 Claims, 9 Drawing Sheets

Related U.S. Application Data

(60) Provisional application No. 62/354,161, filed on Jun. 24, 2016.

(51) Int. Cl.
  *F16H 57/02* (2012.01)
  *F16H 48/38* (2012.01)

(56) References Cited

U.S. PATENT DOCUMENTS

| | | |
|---|---|---|
| 6,589,671 B1 | 7/2003 | Kehrer |
| 10,974,349 B2 | 4/2021 | Yin et al. |
| 2001/0030224 A1 | 10/2001 | Eulenstein et al. |
| 2003/0033899 A1 | 2/2003 | Prucher |
| 2008/0138649 A1 | 6/2008 | Mataga et al. |
| 2009/0084223 A1 | 4/2009 | Harrup et al. |
| 2009/0266198 A1 | 10/2009 | Nosakowski |
| 2010/0081535 A1 | 4/2010 | Gutsmiedl |
| 2012/0097318 A1 | 4/2012 | Thompson et al. |
| 2013/0011182 A1 | 1/2013 | Chen et al. |
| 2016/0003344 A1* | 1/2016 | Mapkar ............... H05K 5/0217 428/35.8 |
| 2017/0152930 A1 | 6/2017 | Bojanowski et al. |
| 2018/0172131 A1 | 6/2018 | Bojanowski et al. |
| 2018/0231112 A1* | 8/2018 | Gorski .................. F16H 48/40 |
| 2019/0178362 A1 | 6/2019 | Horak |
| 2020/0147724 A1* | 5/2020 | Zhang ................. B23K 26/242 |
| 2020/0300348 A1 | 9/2020 | Koerschner et al. |
| 2021/0308806 A1 | 10/2021 | Vasu et al. |

FOREIGN PATENT DOCUMENTS

| | | | |
|---|---|---|---|
| JP | H08320059 A | 12/1996 | |
| KR | 20110122738 A * | 10/2011 | ............ F16H 48/08 |
| WO | 1999058287 | 11/1999 | |
| WO | 2005030423 A1 | 4/2005 | |
| WO | 2010016896 A1 | 2/2010 | |
| WO | 2017173435 A1 | 10/2017 | |

OTHER PUBLICATIONS

International Search Report and Written Opinion dated Sep. 1, 2017; International Patent Application No. PCT/US2017/039224 filed Jun. 26, 2017.
Define overmolding Google Search, Nov. 3, 2021 (Year: 2021).
Define at least one—google search, Jun. 14, 2021 (Year: 2021).
Welding the Nonferrous Metals—General Overview, 2015 Key to Metals AG, Date Published Aug. 2022 (Year: 2002).
Define ferrous metal, Google Search, Jul. 17, 2020 (Year: 2020).
Iron as welding material, Google Search, Jul. 17, 2020 (Year: 2020).
Welding material, Google Search, Jul. 15, 2020 (Year: 2020).

* cited by examiner

DIFFERENTIAL OVERMOLDED WELDABLE RING

CROSS-REFERENCE TO RELATED APPLICATIONS

This application is a continuation of U.S. patent application Ser. No. 16/311,848, entitled "DIFFERENTIAL OVERMOLDED WELDABLE RING," filed on Dec. 20, 2018, which is a 35 U.S.C. 371 national stage filing of PCT Application No. PCT/US2017/039224 filed on Jun. 26, 2017, which claims priority to U.S. Provisional patent application No. 62/354,161 entitled "DIFFERENTIAL OVERMOLDED WELDABLE RING," filed on Jun. 24, 2016, each of which are incorporated herein by reference in their entirety.

FIELD OF INVENTION

The present disclosure relates to a differential assembly. In particular, the present disclosure relates to a differential case with an overmolded ring to which a ring gear may be welded to form a differential assembly configuration suitable for a wide variety of applications including, but not limited to, a differential for an automobile or a ring gear welded to a shaft.

BACKGROUND

A differential is part of a power train of a vehicle that allows an engine to transmit torque and rotation to wheels. The differential allows an outer drive wheel to rotate at a different rate than an inner drive wheel when the vehicle turns. It includes gears or a gear train that are driven by an input shaft to drive output shafts connected to the gears.

A propeller shaft or drive shaft connects to a pinion, and the pinion drives a ring gear of the differential. The ring gear is attached to a differential case or housing and may include teeth for driving other gears or pinions. Traditionally, bolts connect the ring gear with a differential case to prevent movement of the ring gear with respect to the differential case. In other examples, ring gears may be welded or brazed to the differential case.

In some automobiles, a lay shaft transmits power or torque in a drivetrain. These shafts can include toothed gears bolted to or cast with the lay shaft. The input torque and the load on the shafts may restrict the types of materials suitable for the shaft.

Welding or brazing puts limitations on the number and type of materials that can be used. In some differentials, the differential case and the ring gear comprise the same or similar materials, such as iron. Having the same material may allow the ring gear and case to be welded together. If non-similar materials are welded together, the coefficient of thermal expansion mismatch or other differences between the materials may lead to cracks, or other undesired results. For example, welding of iron may leave brittle microstructural constituents and residual stress that may lead to cracking at a joint. In other instances, a ring gear is attached to a case via bolts and other fasteners that add weight and complexity to the assembly. Further, these methods require additional parts, materials, steps, and the like.

SUMMARY

The following presents a summary of this disclosure to provide a basic understanding of some aspects. This summary is not intended to identify key or critical elements or define any limitations of embodiments or claims. Furthermore, this summary may provide a simplified overview of some aspects that may be described in greater detail in other portions of this disclosure.

A drivetrain may include a ring gear and a weld ring. The ring gear and the weld ring may comprise a weldable material. The weld ring may be overmolded with a ferrous material that may be not suitable for welding. The ferrous material may be a differential case or a shaft. The weld ring may comprise a material that is weldable with the ring gear. This may allow the ring and the ring gear to be welded together.

A differential assembly may include a case, a weld ring, and a ring gear. The case may overmold the weld ring. The weld ring may be welded with the ring gear. The ring gear may comprise a first material and the case may comprise a second material.

A shaft for a drivetrain may include a shaft body, a ring gear, and a weld ring. The weld ring may be overmolded with the shaft body. The weld ring and shaft may be machined to specifications. The ring gear may be welded to the weld ring.

A method of manufacturing a drivetrain component may allow for coupling a ferrous component with a weld ring and welding the weld ring to a ring gear. The method may include forming the ferrous component of a first material. The ferrous component may be joined with a weld ring formed from a second material. The weld ring may be welded to a ring gear formed of a third material.

The following description and the drawings disclose various illustrative aspects. Some improvements and novel aspects may be expressly identified, while others may be apparent from the description and drawings.

BRIEF DESCRIPTION OF THE DRAWINGS

The accompanying drawings illustrate various systems, apparatuses, devices and related methods, in which like reference characters refer to like parts throughout, and in which.

DETAILED DESCRIPTION

Reference will now be made to exemplary embodiments, examples of which are illustrated in the accompanying drawings. It is to be understood that other embodiments may be utilized, and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" mean an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Embodiments described herein may refer to welding or laser welding. Laser welding may include utilizing a laser or laser beam to join multiple pieces of metal. The laser beam delivers concentrated heat, which may be particularly suitable for high welding rates and localized heat applications. It is noted that embodiments may utilize other welding techniques such as electron beam welding, arc welding, laser-hybrid welding (e.g., combination of laser beam welding and arc welding), or the like.

While embodiments and examples describe a differential or shaft for a vehicle, it is noted that the systems, apparatuses, and methods described herein may be applied to a variety of applications, including automobiles, aircrafts, personal transport systems (e.g., motorized scooters), or the like. As such, references to a vehicle are used as exemplary embodiments for purposes of explanation and clarity. It is noted that the present teachings may not be limited to such examples.

Figure 2:
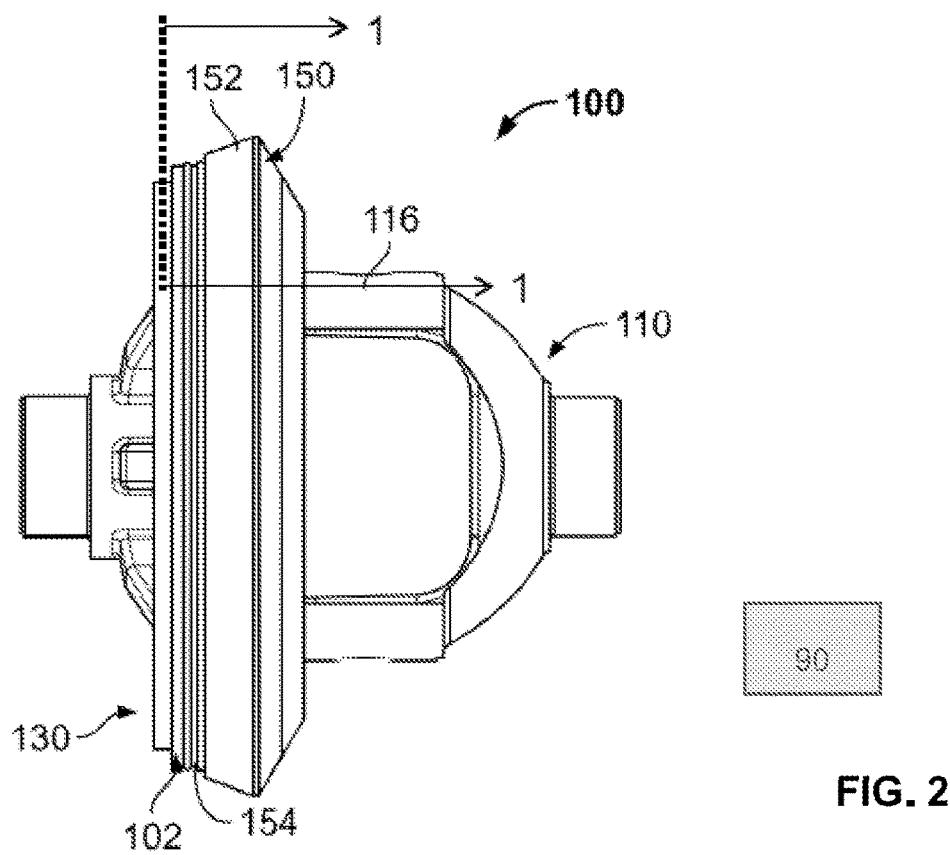
FIG. 2 illustrates a side, perspective view of the differential assembly of FIG. 1 in accordance with embodiments disclosed herein.

A vehicle, as used herein, may comprise an axle assembly, engine (e.g., gas, electric, etc.), such as engine or another component 90 generally shown in FIG. 2, frame, transmission, drive shaft, and driven/non-driven wheels. The engine (such as engine or another component 90) generally produces an output or power (e.g., torque). A transmission may alter speed and torque of the output produced by the engine, such as engine or another component 90. The transmission may transmit the torque to a drivetrain. The drivetrain may include a drive shaft that drives the axle assembly. In an aspect, the drivetrain may include a differential as described herein. The axle assembly drives wheels of the vehicle.

A differential generally includes a housing or case, and a number of gears, pinions, and the like. The gears and pinions may be referred to as a gear set. This gear set may allow for operation of wheels of a vehicle at different speeds. For example, when a vehicle turns, a first or inner wheel (e.g., the wheel at the inner curve of the turn) may be driven at a lower speed than a second or outer wheel. This may result in increased control of the vehicle in comparison to vehicles that do not include a differential.

In some systems, such as automotive systems, the components of a drivetrain (e.g., propeller shaft, lay shaft, a differential, etc.) may be subject to forces that require the components to have a certain strength. For instance, automobiles (e.g., cars, trucks, farm equipment, etc.) may require components to be formed of ferrous materials (e.g., iron, cast iron, steel, etc.). It is noted that drivetrains for vehicles may experience a number of forces and may be subject to constraints (e.g., cost, shape, weight, strength, etc.). Further, as drivetrains contain moving, or non-static, components, there may be unique challenges that are not present in other fields. Many of these unique challenges and issues are addressed by various disclosed aspects.

In applications, some components of the differential may not need to have the strength of steel. Different materials can be used for applications where steel is not needed or where weldability is not needed for the bulk of the component. This may allow for reduced weight of the differential, more efficient assembly, or the like. One such application may allow a differential housing to be made of nodular or ductile iron or a non-ferrous material (e.g., aluminum, etc.). A differential housing or other component, such as a lay shaft, may be overmolded onto a different material, such as a low-alloy, mild, or plain-carbon steel ring that is suitable for welding. Examples of weld-friendly or suitable-for-welding materials include low-carbon low-alloy steels, steels having a carbon equivalent of less than 0.40% according to the International Institute of Welding equation, etc. While embodiments may refer to steel, it is noted that other materials may be utilized, such as aluminum, magnesium, copper, lead, nickel, tin, titanium, zinc, alloys, or the like. Such materials may not have the same strength as ferrous materials, but may be lighter weight, cheaper, and/or more than sufficient for certain applications.

A cast-in ring or insert may allow for welding of a gear to a shaft or a differential assembly. For instance, a ferrous material ring, suitable for welding, may be cast into a casting material that is not suitable for welding. A ring gear may then be welded to the cast-in ring. Thus, the ring gear is welded to a weld-friendly material. This may allow for reduced (e.g., eliminated) cracking associated with welding high pearlitic nodular material to steel parts. In another aspect, this may reduce (e.g., eliminate) the need to use preheating systems or methods to weld nodular material with steel parts or other parts.

For instance, laser welding a nodular or ductile iron part to a steel part may result in cracking in the nodular part. The heat affected zone of the nodular iron part from laser welding may contain brittle microstructural constituents. This may lead to cracking from residual stress, high cooling rates, or the like. In some instances, parts may be preheated for welding. The techniques for preheating may be expensive and time consuming. The present disclosure may solve these as well as other issues.

As an example, as consumers become more conscious of fuel saving automobiles, vehicle weight becomes more important. Moreover, lighter weight vehicles may place a reduced amount of stress on a drivetrain in comparison with heavier, traditional vehicles. For these and other reasons, components of a drivetrain may be made of lighter weight materials than conventional systems, disclosed apparatuses and methods may reduce production steps, costs, and/or reduce the number of components of the differential.

In at least one embodiment, a differential case may comprise a castable metal that is cast within and/or about a portion of a weld ring. In other embodiments, the weld ring may comprise a castable metal that is within or about a portion of the differential case. The case and the weld ring may comprise different materials. For instance, the case may comprise iron (e.g., a nodular iron) and the weld ring may comprise steel (e.g., low-alloy steel, mild steel, etc.). A ring gear may be welded to the weld ring, such as via laser welding. It is noted that the ring gear may be welded such that the weld joint is only between the weld ring and the ring gear.

The ring gear may comprise steel or another metal having a desired strength for driving pinions and/or wheel axles. The ring gear may be formed as a substantially circular ring. It is noted that the ring gear may or may not have teeth formed thereon during the casting or welding process. For instance, if the teeth are formed prior to welding, they may be damaged or deformed during the welding process. Thus, the teeth may be formed after welding. When formed after welding, the teeth may be subsequently hardened, such as through an induction hardening process. It is noted that the teeth may be formed prior to welding and may be protected by a protective member or otherwise protected.

Figure 1:
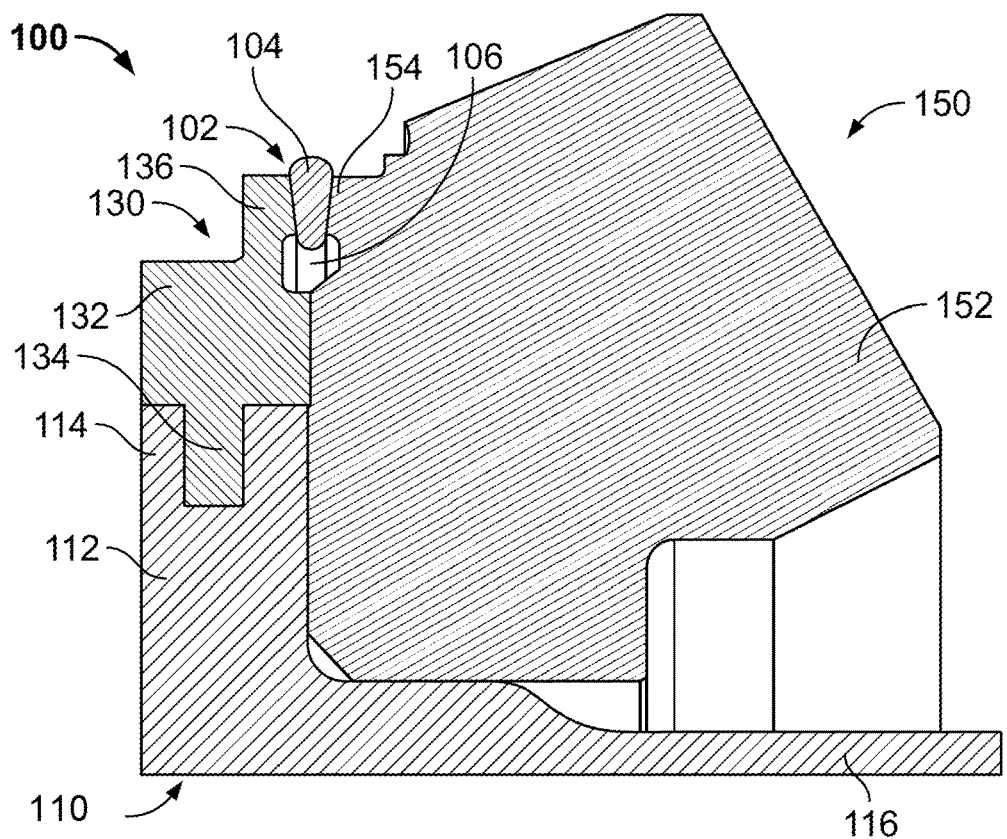
FIG. 1 is a side, cross-sectional view of a differential assembly, taken along line 1-1 shown in FIG. 2, comprising a case, a weld ring and a ring gear in accordance with embodiments disclosed herein.
Figure 3:
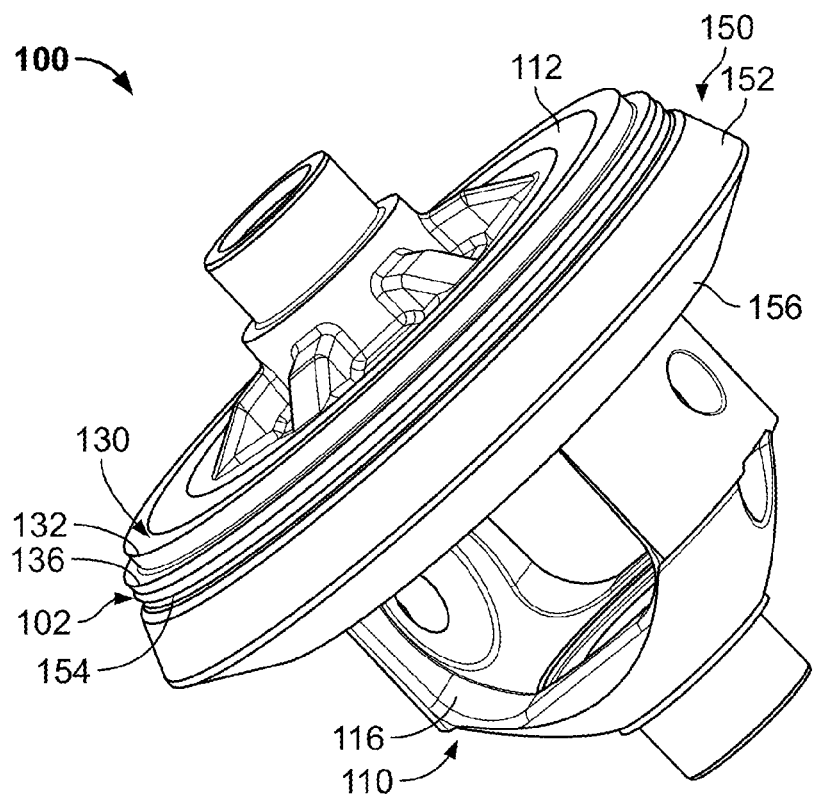
FIG. 3 illustrates another side, perspective view of the differential assembly of FIG. 1 in accordance with embodiments disclosed herein.

Turning now to the figures, FIGS. 1-3 illustrate an exemplary differential assembly 100. The differential assembly 100 may primarily comprise a case 110, weld ring 130, and a ring gear 150. It is noted that the differentially assembly 100 may include other components such as pinions (not shown), gears (not shown), machined apertures, or the like. In another aspect, while depicted as comprising a beveled ring gear 150, the ring gear may comprise a helical ring gear (see, e.g., FIG. 10).

Case 110 may comprise a body 116 and a flange 112. The body 116 may operatively house one or more gears, pinions, or the like. The flange 112 may extend from the body 116. In an aspect, the flange 112 may be generally circular, cylindrical, or the like. Body 116 and flange 112 may be monolithically formed and/or may be separately formed and joined together. According to at least one embodiment, body 116 and flange 112 may be formed of or comprise a first material, such as nodular material. In an aspect, the nodular material may be a ferrous material, such as iron and/or iron alloys. It is noted that the first material may comprise a different material than the material that makes up weld ring 130 and/or ring gear 150, as described in more detail herein. For instance, the case 110 may comprise a nodular iron that may be cast into a desired shape and the weld ring 130 and ring gear 150 may comprise steel. It is noted that certain geometric aspects may be machined into the case 110, weld ring 130, and/or ring gear 150 after casting, welding, or the like.

Weld ring 130 may comprise a generally ring-shaped body 132. The body 132 may be cast in or about the case 110. In an example, the body 132 may be formed and the case 110 may be overmolded within the body 132. It is noted that the order of casting or overmolding may depend on the types of materials utilized, a manufacturing process, or other design factors. For sake of brevity, embodiments generally refer to the body 132 being cast about the case 110. In an aspect, a protrusion 134 may extend from the body 132 and into a via or groove 114 of the flange 112 of case 110. The groove 114 and protrusion 134 may provide a joint that compensates for forces (e.g., torque, etc.) that may affect the weld ring 130. For example, the differential assembly 100 may be subject to various forces during operation of a vehicle. The groove 114 and protrusion 134 may provide a locking mechanism or anchor that generally prevents or reduces the possibility of slippage between the case 110 and the weld ring 130. While differential assembly 100 is illustrated with the groove 114 and protrusion 134, it is noted that other geometric formations or features may be utilized for the joint.

Turning to FIGS. 5-9, there are weld ring 500, weld ring 600, weld ring 700, weld ring 800, and weld ring 900. It is noted that like-named components of weld rings 500-900 may comprise similar aspects, unless context suggests otherwise or warrants a particular distinction among the terms. For instance, the weld rings 500-900, may comprise similar or the same materials.

As shown, the weld rings 500-900 may comprise out-of-plane or 3-dimensional features. Such features comprise geometric patterns or formations that allow cast-in material to flow in, around, through, or otherwise about the formations. For instance, the features prevent the joint of a protrusion and groove from being coplanar.

Figure 5:
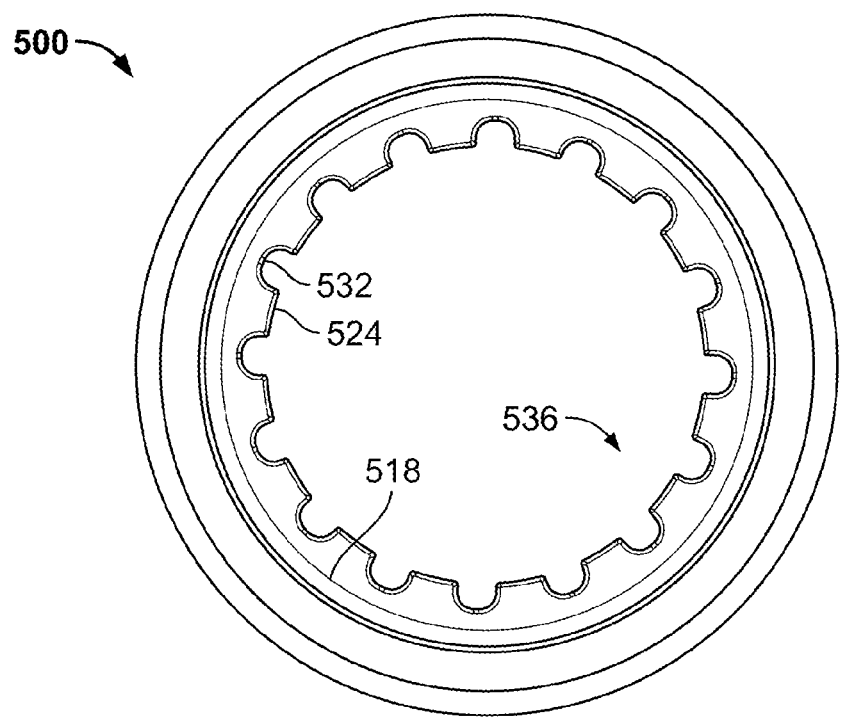
FIG. 5 illustrates an exemplary weld ring comprising protrusions formed on an inner surface in accordance with embodiments disclosed herein.

FIG. 5 illustrates weld ring 500 comprising a plurality of protrusions or nodes 524 extending from an inner ring 536 disposed proximal inner surface 518. The nodes 524 may be separated by cutouts 532. When a case or shaft is casted, it may fill the cutouts 532 and interlock with nodes 524.

Figure 6:
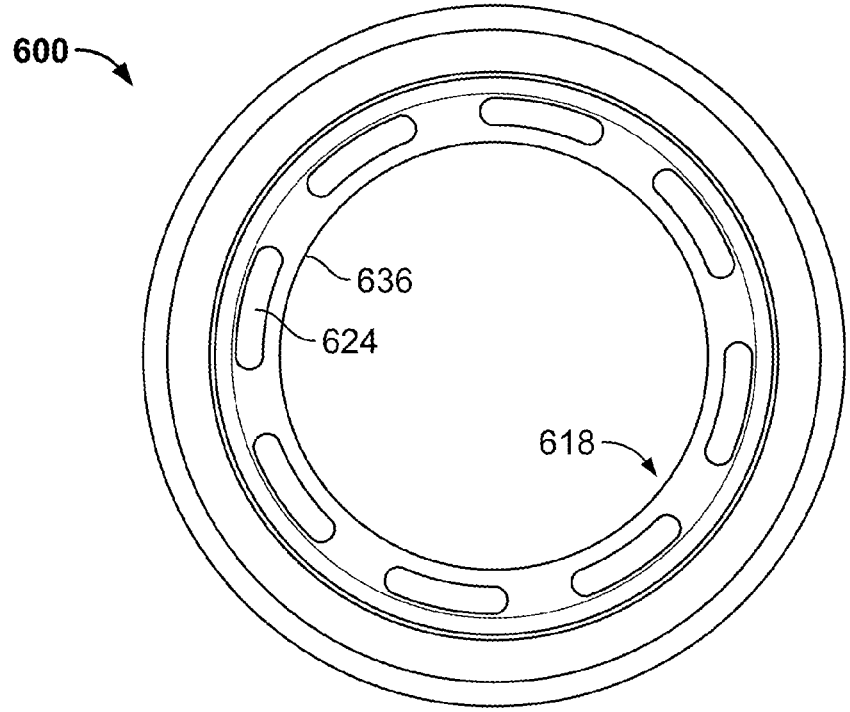
FIG. 6 illustrates an exemplary weld ring comprising cut outs formed on an inner surface in accordance with embodiments disclosed herein.
Figure 7:
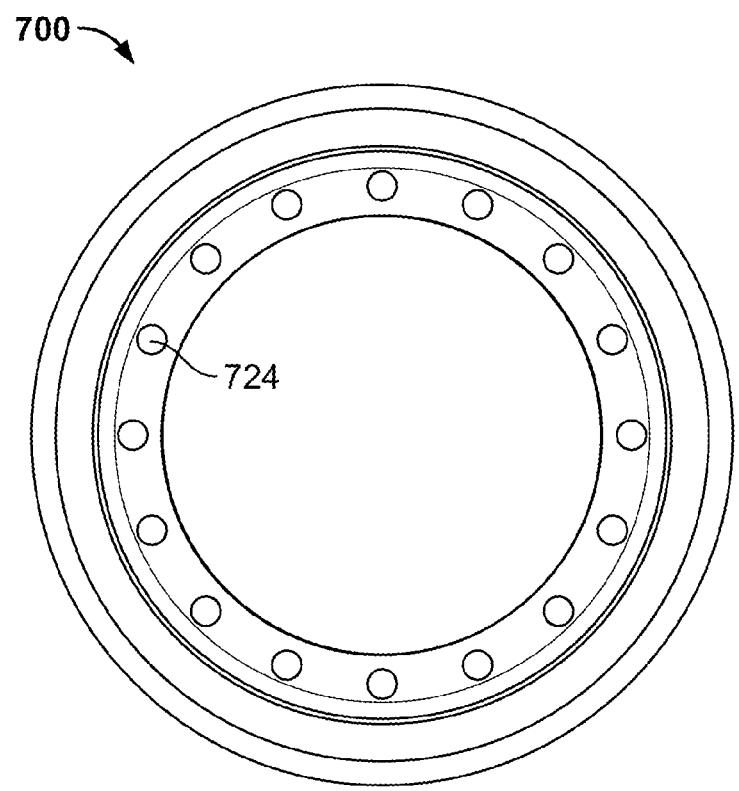
FIG. 7 illustrates an exemplary weld ring comprising circular cut outs formed on an inner surface in accordance with embodiments disclosed herein.

FIG. 6 illustrates weld ring 600 comprising a plurality of cutouts 624 disposed within an inner ring 636. The inner ring may extend from inner surface 618 of the weld ring 600. When a case is casted, it may fill the cutouts 624 to interlock with the weld ring 600. The cutouts 624 may comprise any desired shape, such as polygonal, rectangular, elliptical, irregular in shape, or the like. For instance, FIG. 7 illustrates a weld ring 700 comprising a plurality of generally circular cutouts 724. In various embodiments, cutouts 624, 724 may extend entirely through the ring (e.g., holes, passages, orifices, etc.) or only partially through the ring (e.g., divots, depressions, etc.).

Figure 8:
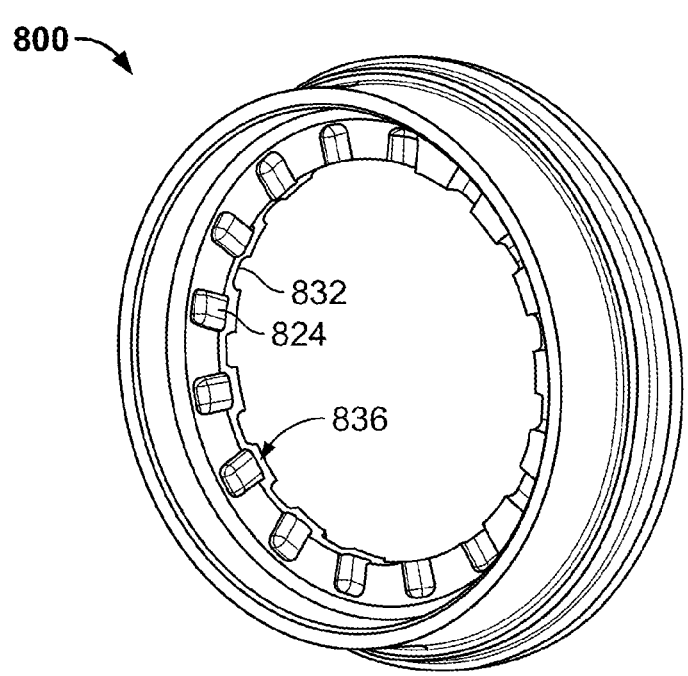
FIG. 8 illustrates an exemplary weld ring comprising depressions formed on an inner surface in accordance with embodiments disclosed herein.

FIG. 8 illustrates weld ring 800 that may comprise depressions 824 and 832 formed in an inner ring 836. In an aspect, the depressions 824 and 832 may alternate sides of the inner ring 836. The depressions 824 and 832 may comprise any desired shape, such as polygonal, rectangular, elliptical, irregular in shape, or the like. When material is cast around the depressions 824 and 832 the material may fill the depressions 824 and 832. This may allow a case to be cast into the weld ring 800 and lockable secure thereto.

Figure 9:
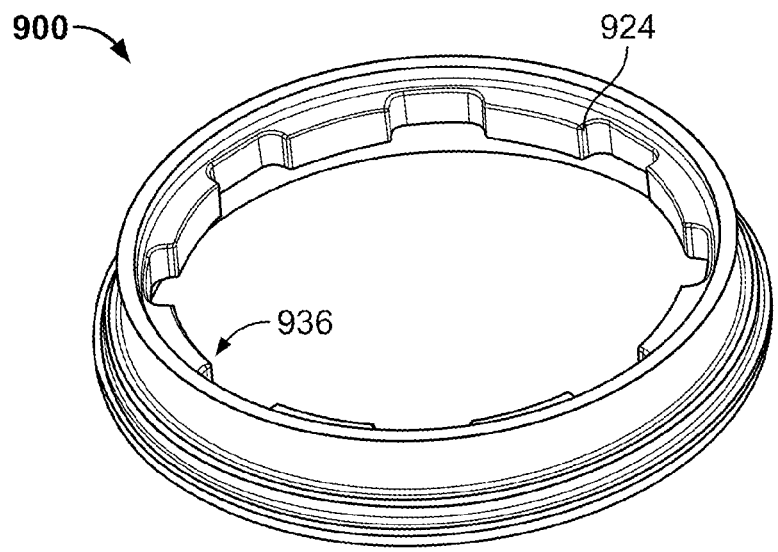
FIG. 9 illustrates a perspective view of another exemplary weld ring comprising protrusions formed on an inner surface in accordance with embodiments disclosed herein.

FIG. 9 illustrates weld ring 900 that may comprise notches or protrusions 924 formed in an inner ring 936. The notches 924 may comprise any desired shape, such as polygonal, rectangular, elliptical, irregular in shape, or the like. When material is cast around the protrusions 924 the material may fill or surround the protrusions 924. This may allow a case to be cast into the weld ring 800 and lockable secure thereto.

The formations described here as well as elsewhere may allow for transmission of torque from a ring gear to another operable component (e.g., a shaft, a differential case, etc.). For instance, a differential case or a shaft may be overmolded with the weld ring. The features of the weld ring may allow the material of the case or a shaft to flow into or about the feature. This may prevent slippage during rotation of a case or shaft. In another aspect, the out-of-plane features facilitate bonding and resist separation of the materials during shrinkage as the cast material cools. The features of the weld ring may prevent or reduce disengaging between the material and the weld ring. Turning back to FIG. 1, the weld ring 130 may comprise a second material, which may be a different material than the material of the case 110. For instance the weld ring 130 may comprise a steel material, such as mild steel (e.g., plain-carbon steel), or the like. It is noted that weld ring 130 may comprise other materials that may be selected for a desired application. The second material may be selected such that it may be operatively welded to the ring gear 150.

According to at least one embodiment, the ring gear 150 may comprise a body 152 that comprises a third material, which may be different from the material of the case 110 (e.g., the first material). In another aspect, the third material may be the same or different material as that of the weld ring 130 (e.g., the second material). For instance, the ring gear 150 may comprise steel, such as forged steel or other steel that may be appropriate for the forces to which the ring gear 150 is exposed during operation of a vehicle. Weld ring 130 may also comprise steel, which may be the same or different type of steel as that of ring gear 150. For example, weld ring 130 may not be subject to the same forces as ring gear 150, which may allow for use of a weaker steel (e.g., mild steel). As described herein, case 110 may comprise iron, such as a higher pearlitic content nodular iron or the like. As such, the weld ring 130 may provide a surface for which the ring gear 150 may be welded without the need for preheating and/or without many issues related to thermal mismatch between steel and iron materials.

In one or more embodiments, the ring gear 150 may include a flange 154 or other connection portion that may be joined to a flange 136 of weld ring 130. Joining may include welding the flange 136 and flange 154 at a weld joint 102. The weld joint 102 may comprise a weld 104 that joins the flange 136 of weld ring 130. It is noted that the weld joint 102 may include an expansion area 106, which may comprise a cavity formed between the weld ring 130 and the ring-gear 150.

It is further noted that ring gear 150 may be formed or pre-manufactured without teeth. This may prevent damage to sprockets or teeth during welding. Thus, after the case 110, weld ring 130, and ring gear 150 are assembled, the teeth (not shown) may be formed on a surface 156 of ring gear 150. For example, the teeth may comprise curved grooves formed in surface 156. These teeth may interact with pinions or gears that may drive an axle of a vehicle. According to at least one embodiment, the teeth may be pre-formed in the ring gear 150 prior to attaching the ring gear 150 to the weld ring 130.

In an aspect, the teeth may comprise an input member that may operatively receive torque from an engine, such as engine or another component 90, such as via a pinion gear, drive shaft or the like. The ring gear 150 may transfer the torque via the weld joint 102. The weld joint 102 may transmit the torque to the weld ring 130 and the case 110. Case 110 may rotate and may transmit the torque to one or more gears (e.g., side gears, spider gears, etc.). It is noted that the weld joint 102, weld ring, case, and/or gears may be considered an output member for the ring gear 150.

The teeth may be hardened after they are formed or machined. In an aspect, the ring gear 150 and the weld ring 130 may be subjected to coefficient of thermal expansion mismatch. Because of this mismatch, some hardening techniques would weaken and/or damage weld joint 102. As such, localized hardening techniques may be utilized to harden the teeth. For instance, induction hardening may target the teeth with localized heat treatment. This will localize the heat or hardening process such that the weld ring 130 and/or weld joint 102 maintains its integrity and desired properties.

It is noted that various materials may be utilized for the case 110, weld ring 130, and/or ring gear 150. These components may comprise different materials, such that weld ring 130 and ring gear 150 may be welded together, and wherein the ring gear 150 and case 110 are generally not weldable together without first heat treating the components or applying other techniques.

In another aspect, weld ring 130 and case 110 may be joined together utilizing various techniques other than overmolding. For instance, the weld ring 130 may be fastened to the case 110 via one or more fasteners (e.g., screws, bolts, rivets, etc.). It is further noted that various disclosed aspects may be combined. In an example, the weld ring 130 may be cast-in the case 110 and fastened to the case 110 via a fastener.

Figure 4:
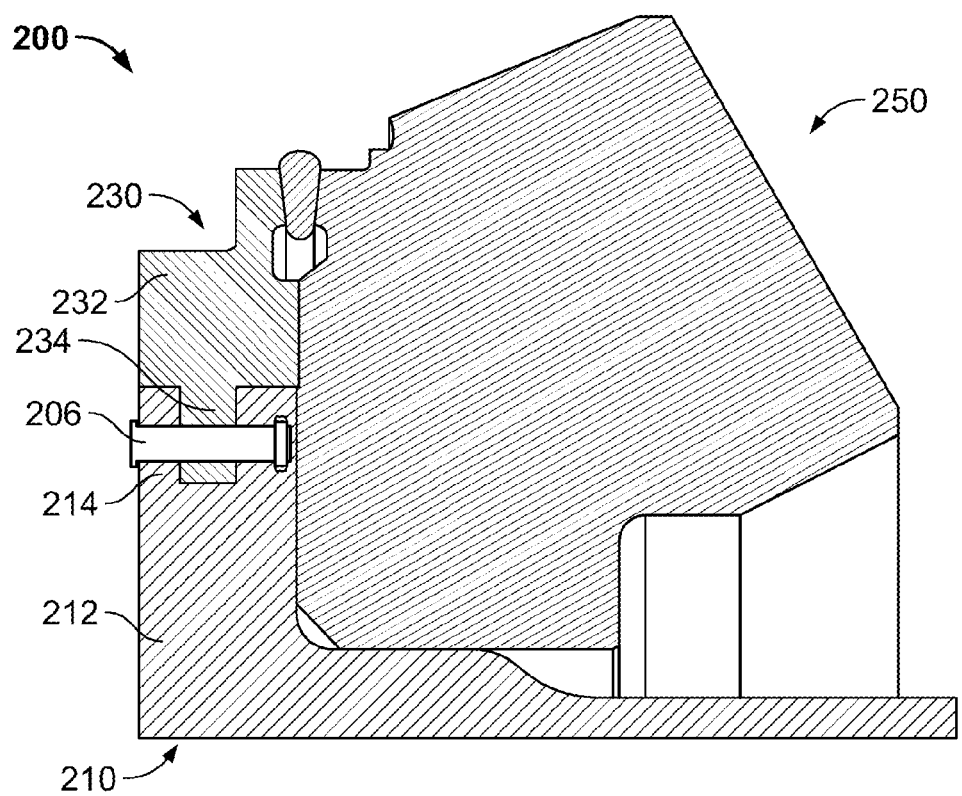
FIG. 4 is a cross sectional view of a differential assembly comprising a case with a fastener coupled to a weld ring in accordance with embodiments disclosed herein.

Turning to FIG. 4, there is a differential assembly 200 comprising a ring gear 250, and a case 210 that is coupled to a weld ring 230 via at least one fastener 206. It is noted that differential assembly 200 may comprise the same, similar, or different aspects as those described with reference to differential assembly 100. For instance, the materials utilized for case 210, weld ring 230, and ring gear 250 may be the same materials utilized for case 110, weld ring 130, and ring gear 150, respectively.

As illustrated, the weld ring 230 may comprise a body 232 and a flange 234. The flange 234 may be received by a groove 214 formed in a flange 212 of the case 210. In an aspect, the weld ring 230 may be cast-in the case 210. An aperture may be formed through the flange 234 and the flange 212 such that a fastener 206 may be inserted therethrough. It is noted that the fastener may comprise a bolt, screw, or the like. After insertion, the faster 206 may be secured to the case 210 and/or weld ring 230 via a nut or other threaded member.

In an aspect, the fastener 206 may comprise an anchor point or the like that may prevent slippage or between the weld ring 230 and the case 210. For example, the ring gear 250 may be subject to various forces. Torque may cause the ring gear 250 to pull the weld ring 230. Fastener 206 may provide an anchor or the like that may prevent or reduce the ability for weld ring 230 to separate from the case 210. Moreover, it is noted that the differential assembly 200 may comprise any number of fasteners. In at least one aspect, the out-of-plane formations described herein may comprise fasteners and may prevent or reduce separation between weld ring 230 and case 210.

Figure 10:
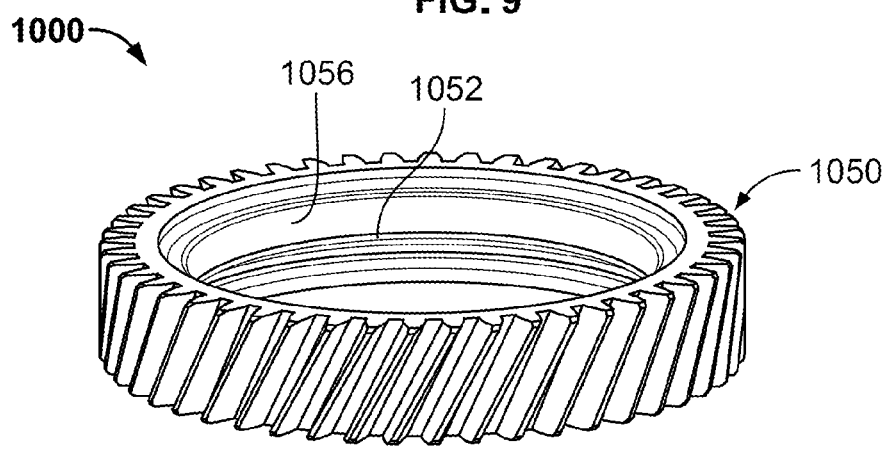
FIG. 10 illustrates an exploded view of a differential case overmolded with a weld ring, and a ring gear in accordance with embodiments disclosed herein.
Figure 10:
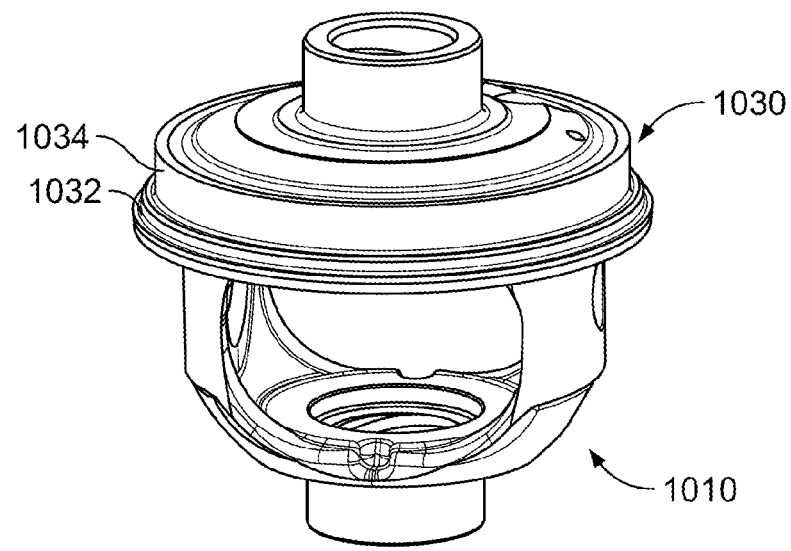

Turning to FIG. 10, there is a differential assembly 1000. The differential assembly 100 may primarily include a case 1010, a weld ring 1030, and a ring gear 1050. While shown as a helical-type gear, it is noted that ring gear 1050 may comprise various other types of gears as described herein. Moreover, differential assembly 1000 may comprise similar aspects described with reference to the other disclosed figures. For instance, the case 1010 may comprise a ferrous material not suitable for welding (e.g., ductile iron, gray cast iron, compacted graphite iron, etc.), while weld ring 1030 and ring gear 1050 may comprise steel or other materials that are suitable for welding.

In an embodiment, weld ring 1030 may be formed and case 1010 may be cast in to the weld ring 1030. It is noted that weld ring 1030 may be machined after casting of the case 1010. For instance, weld ring 1030 may comprise a ring of steel. Prior to casting, the weld ring 1030 may or may not comprise features 1032 formed on outer surface 1034. The features 1032 may comprise ridges, threads, tabs, or the like. In an aspect, the features 1032 may be machined before or after overmolding of the case 1010. When machined after an overmolding process, the features 1032 do not risk being damaged during the process.

Ring gear 1050 may include geometric features 1052 (e.g., projections, lips, tabs, etc.) disposed on an inner surface 1056 of the ring gear 1050. The ring gear 1050 may be press-fit, friction-fit, or otherwise placed about the weld ring 1030. One or more of the geometric features 1052 may interface with features 1032 of the weld ring 1030. In an aspect, the geometric features 1052 of the ring gear 1050 may include one or more lips. The lips may comprise different parameters. For example, lips may extend from inner surface 1056 for different lengths. The lengths may allow for operative alignment of the weld ring 1030 as described here as well as elsewhere in this disclosure.

It is noted that the inner surface 1056 of the ring gear and the outer surface 1034 of the weld ring may comprise additional or different geometric features that may generally provide mechanisms for securing or aligning inner surface 1056 and outer surface 1034. For instance, inner surface 1056 and outer surface 1034 may include splines, flutes, threads, tapered surfaces, channels, or the like. As described herein, the ring gear 1050 and weld ring 1030 may be welded together to secure the weld ring 1030 to the ring gear 1050.

Figure 11:
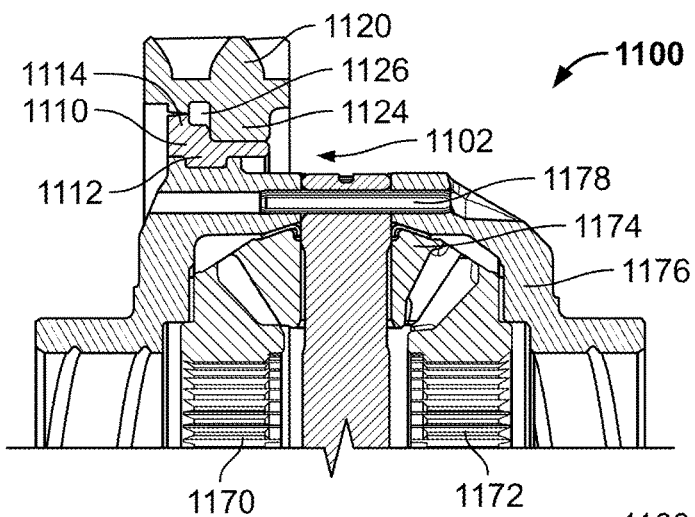
FIG. 11 illustrates a cross sectional view of a differential case with an axial weld in accordance with embodiments disclosed herein.
Figure 12:
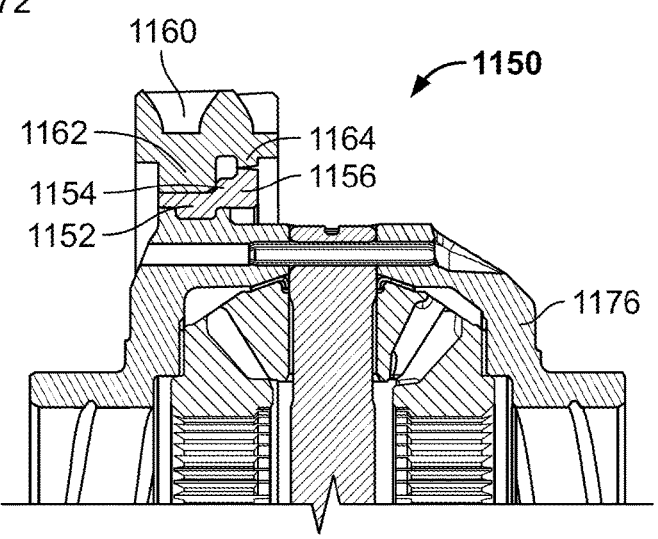
FIG. 12 illustrates a cross sectional view of another differential case with an axial weld in accordance with embodiments disclosed herein.
Figure 13:
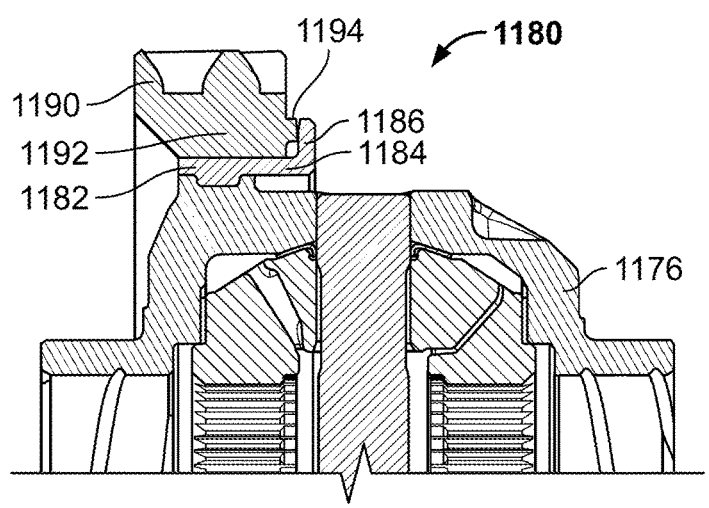
FIG. 13 illustrates a cross sectional view of a differential case with a radial weld in accordance with embodiments disclosed herein.

FIGS. 11-13 are partial cross-sectional views of differential assembly 1100, differential assembly 1150, and differential assembly 1180 and provide examples of axial and radial welding between the weld ring and ring gear. It is noted that each of the differential assemblies 1100, 1150, and 1180 may include a first side gear 1170, a second side gear 1172, one or more pinion or spider gears 1174 and a case 1176. It is noted that the above listed components may operatively receive input (e.g., power or torque) from a drive shaft (not shown) that interacts with a ring gear. The ring gear may rotate the case 1176, which may operatively deliver power to the one or more spider gears 1174 via cross-pin 1178. The spider gears 1174 may operatively deliver power to the first side gear 1170 and the second side gear 1172. The first side gear 1170 may be coupled to a first wheel via a first axle shaft. The second side gear 1172 may be coupled to a second axle shaft, which may in turn be coupled to a second wheel.

Embodiments may utilize various construction or welding techniques. For instance, differential assembly 1100 and differential assembly 1150 illustrate axial weld assemblies. Differential assembly 1180 illustrates a radial weld embodiment. It is noted that other welding techniques may be utilized.

As described in herein, embodiments may include weld rings and ring gears having various parameters. The differential assembly 1100 may include weld ring 1110 and ring gear 1120. The weld ring 1110 may comprise inner surface formations 1112 that may allow case 1176 to form around the formations 1112. In another aspect, weld ring 1110 may include outer surface formations 1114 that may include one or more protrusions, ridges, or the like. It is noted that corners of the outer surface formations 1114 may be squared, tapered, chamfered, filleted, or the like. The outer surface formations 1114 may interface with formations 1124 of the ring gear 1120. It is noted the formations 1124 may comprise one or more protrusions, ridges, or the like, having corners that may be squared, tapered, chamfered, filleted, or the like. In an aspect, the outer surface formations 1114 may be welded to the formations 1124 such that ring gear 1120 and weld ring 1110 are generally secured together. As described herein, the welding may form a weld joint 1102. It is noted that the joint may include one or more expansion areas 1106.

FIG. 12 illustrates the differential assembly 1150 comprising weld ring 1152 and ring gear 1160, which may comprise similar aspects as weld ring 1110 and ring gear 1120 of differential assembly 1100. The weld ring 1152 may comprise a first flange 1154 and a second flange 1156. The first flange 1154 may generally extend a first distance away from the case 1176 and the second flange 1156 may extend a second distance from the case 1176. The first distance may be generally lesser than the second distance.

Ring gear 1160, likewise, may comprise a first flange 1162 and a second flange 1164. The first flange 1162 may generally extend closer to the case 1176 than the second flange 1164. As such, the ring gear 1160 may engage with the weld ring 1152 such that the first flange 1162 of the ring gear 1160 abuts the first flange 1154 of the weld ring 1152. This may increase surface contact, prevent or reduce slippage, or otherwise allow for more efficient construction of the differential assembly 1150.

FIG. 13 illustrates the differential assembly 1180 comprising weld ring 1182 and ring gear 1190. In aspect, the contact area for weld ring 1182 and ring gear 1190 may be generally larger than the contact areas of differential assembly 1100 and differential assembly 1150. Weld ring 1182 may comprise an L-like shape. A body 1184 may extend generally parallel to the case 1176. The body 1184 may turn or bend upwards to flange 1186. The body 1184 and the flange 1186 may respectively contact inner surface 1192 and protrusion 1194 of the ring gear 1190.

Figure 14:
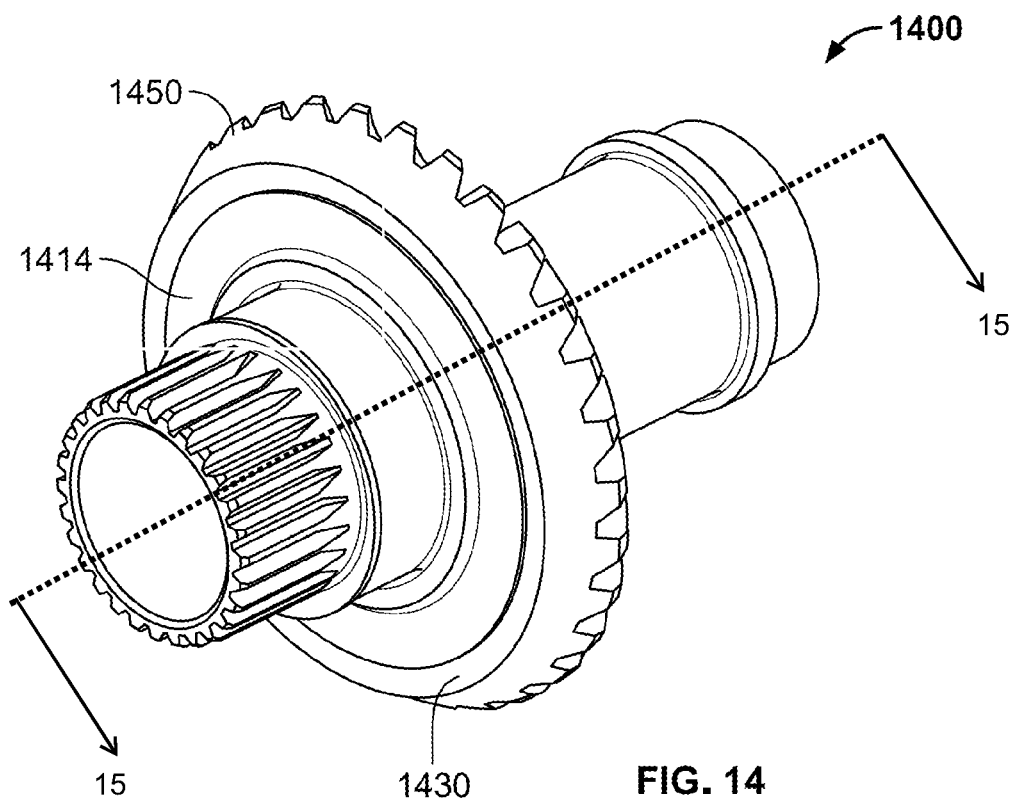
FIG. 14 illustrates a perspective view of a shaft assembly with a weld ring and a ring gear in accordance with embodiments disclosed herein.
Figure 15:
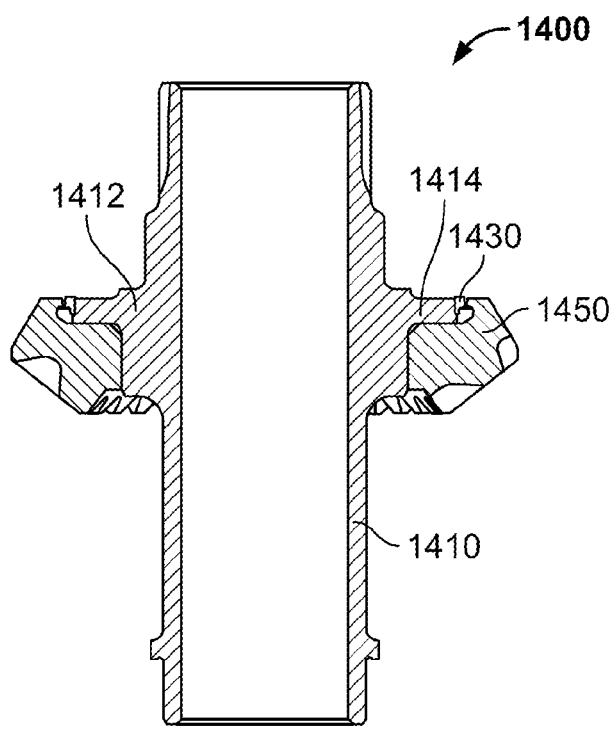
FIG. 15 illustrates a partial cross sectional view of a ring gear, weld ring, and shaft body of the shaft assembly of FIG. 14 in accordance with embodiments disclosed herein.

FIGS. 14 and 15 are a shaft assembly 1400 for a drivetrain in accordance with various disclosed aspects. The shaft assembly 1400 may generally include a lay shaft or shaft 1410, a weld ring 1430, and a ring gear 1450. It is noted that the shaft assembly 1400 may be a component of a drivetrain, such as a component in a power transfer unit, transfer case, transmission, or the like. It is noted that the shaft assembly 1400 may be operatively deployed in other portions of a drivetrain, rear wheel drive automobiles, all wheel drive automobiles, or the like. Embodiments may refer to front wheel drive automobiles for purposes of illustration and brevity.

In at least one example, the shaft 1410 may be a shaft for a front wheel drive vehicle with a disconnecting power transfer unit. For instance, an actuator may operatively position (e.g., slide or otherwise move) the shaft 1410 such that ring gear 1450 operatively changes a connection state (e.g., connects or disconnects) relative to a pinion gear or other gear. In such a manner, the ring gear 1450 may disconnect from a pinion to prevent or end power transfer to rear wheels. Similarly, the ring gear 1450 may connect to a pinion to send or enable power transfer to rear wheels.

It is noted that the ring gear 1450 may generally comprise a material that is not weldable with a material of the shaft 1410. For instance, the ring gear 1450 may comprise a steel material and the shaft 1430 may comprise ductile iron. It is noted that the ring gear 1450 and the shaft 1410 may comprise other materials in accordance with various disclosed aspects.

According to an embodiment, shaft 1410 may include a mount member 1412. The mount member 1412 may comprise a seat or flange for receiving the ring gear 1450. For instance, a flange 1414 of the mount member 1412 may protrude outwards from the shaft 1410. The flange 1414 may include a weld ring 1430 that may be overmolded by the flange 1414. The weld ring 1430 may comprise a material that may be operatively welded with the ring gear 1450. It is noted that the weld ring 1430 may comprise various materials (e.g., steel, etc.) as described herein.

Figure 16:
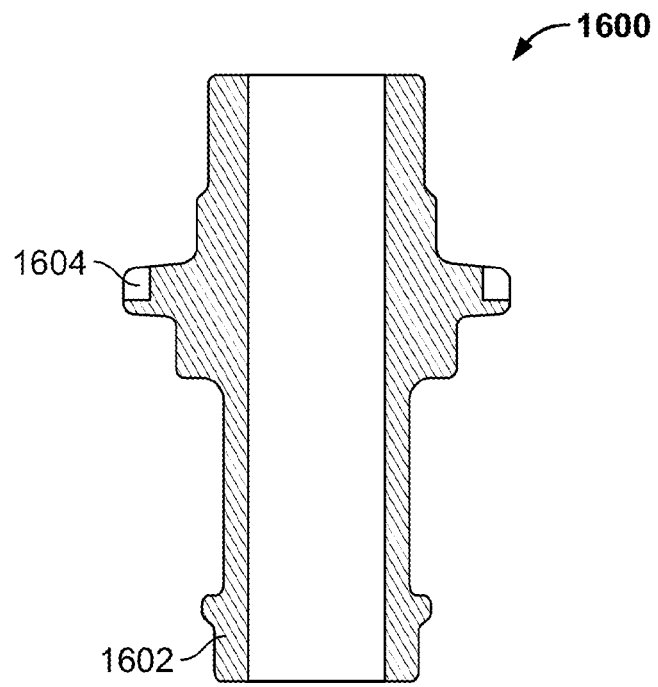
FIG. 16 illustrates a cross sectional view of the shaft assembly of FIG. 14 after or during a casting process in accordance with embodiments disclosed herein.
Figure 17:
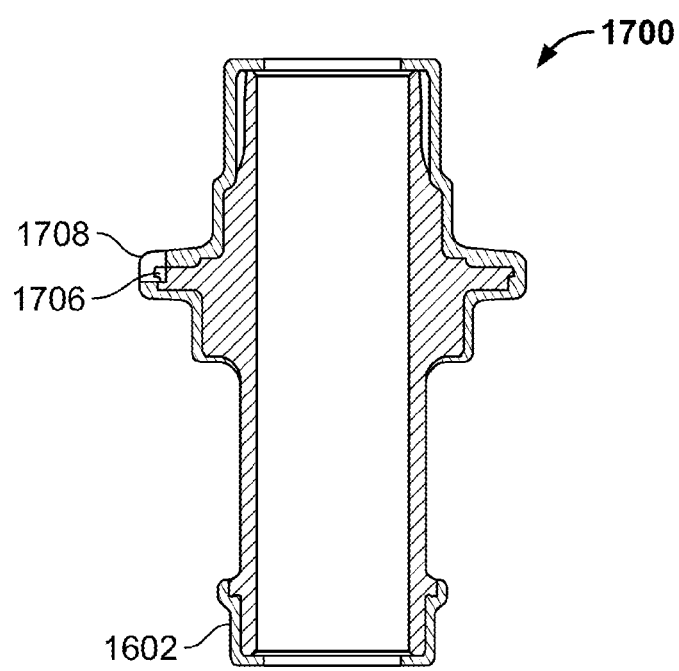
FIG. 17 illustrates a cross sectional view of the shaft assembly of FIG. 14 after or during a machining process in accordance with embodiments disclosed herein.

Turning to FIGS. 16-17, with reference to FIGS. 14-15, there cross-sectional views of the shaft 1410 at various stages of manufacturing. Stage 1600 illustrates a cast material 1602 (e.g., cast ductile iron) that overmolded a weldable material 1604. The cast material 1602 and weldable material 1604 may be machined down to more precise measurements and dimensions as shown in stage 1700. At stage 1600, however, the cast material 1602 and weldable material 1604 may comprise rough dimensions and unformed surface features. In an aspect, the features may be machined after casting. This may prevent damage during the casting process.

At stage 1700, as shown in the shaded areas, weldable material 1604 may comprise a waste area 1708 and a weld ring area 1706. The waste area 1708 may generally represent material that is removed during a machining process. The weld ring area 1706 may generally represent material that will be kept to form the weld ring 1430 of shaft 1410.

While embodiments may refer to weld ring as a ring, it is noted that in other embodiments a weld ring may not be a ring. For instance, a weld ring may comprise disparate pieces or portions of material. In an example, a weld ring may comprise two more portions of material that are not physically connected to each other. In another aspect, a weld ring may not be circular or elliptical in shape. Likewise, a weld ring may comprise one or more rings.

Figure 18:
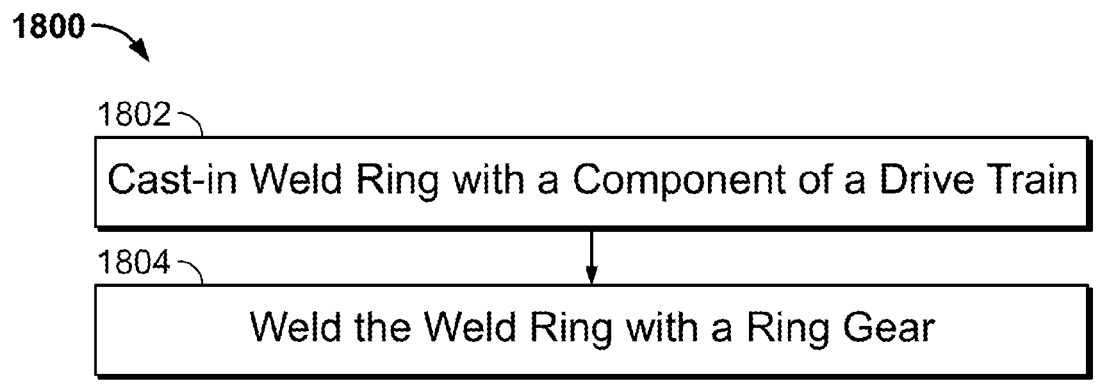
FIG. 18 illustrates an exemplary method of manufacturing a component for a drivetrain of a vehicle in accordance with embodiments disclosed herein.
Figure 19:
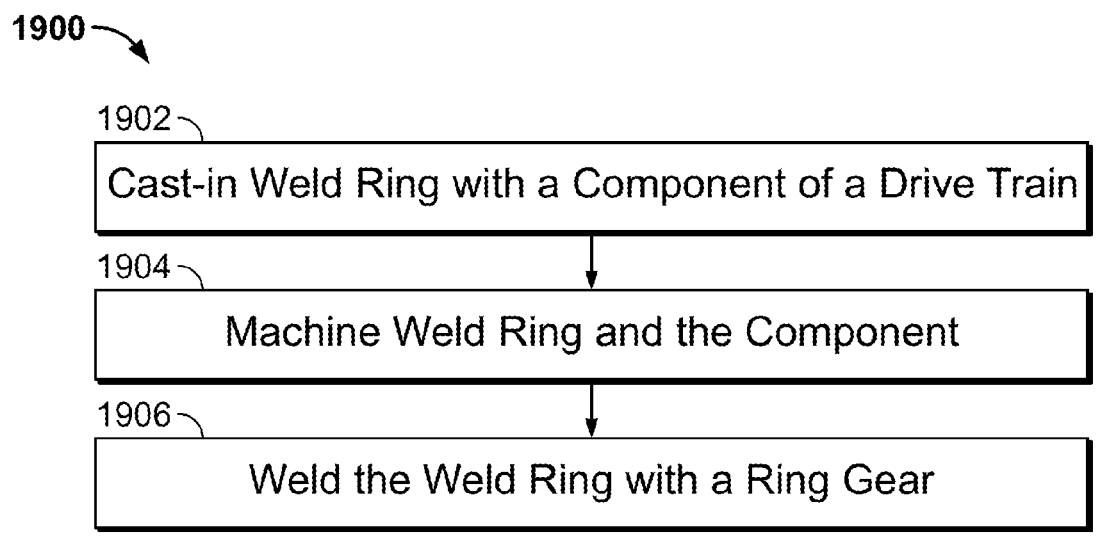
FIG. 19 illustrates an exemplary method of manufacturing a component of a drivetrain of a vehicle including machining the component and a weld ring in accordance with embodiments disclosed herein.

In view of the subject matter described herein, methods that may be related to various embodiments may be better appreciated with reference to the flowchart of FIGS. 18 and 19. While the methods are shown and described as a series of blocks, it is noted that associated methods or processes are not limited by the order of the blocks unless context suggests otherwise or warrants a particular order. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

FIG. 18 is a flow chart of an exemplary method 1800 of manufacturing a component of a drivetrain as described herein. The method 1800 may be utilized to form a component of a drivetrain having a ring gear that is a different material than the component. For example, a differential may comprise an iron case and a steel ring gear.

At 1802, a manufacturer may cast-in or overmold a weld ring (e.g., 130, 230, etc.) with a component of a drivetrain (e.g., a differential case, a shaft, or the like). For instance, the weld ring may be positioned in a mold cavity or die, such as a die for a drivetrain component. It is noted that positioning the weld ring may include other or additional steps, such as coating the die (e.g., with a lubricant, mold release, etc.), coating the weld ring, or the like.

At 1804, the manufacturer may weld the weld ring with a ring gear (e.g., ring gear 150, 250, etc.). Welding may include laser welding or the like. It is noted that this ring gear may comprise a steel material that may or may not be subject to a hardening process. In an aspect, the ring gear may be pre-manufactured then provided to another party that may cast materials. In an aspect, the ring gear may comprise steel, such as a forged steel.

FIG. 19 is a flow chart of an exemplary method 1900 of manufacturing a component of a drivetrain as described herein. As described herein, the component may include a case of a differential, a shaft, or the like.

At 1902, a manufacturer may cast-in or overmold a weld ring (e.g., 130, 230, etc.) with a component of a drivetrain (e.g., a differential case, a shaft, or the like). It is noted that the manufacturer may form the weld ring with extra material so that it may be machined in a later step. In another aspect, the component may be formed with extra material so that it may be machined in a later step. For instance, the weld ring may be positioned in a mold cavity or die, such as a die for a component of a drivetrain. It is noted that positioning the weld ring may include other or additional steps, such as coating the mold cavity, coating the weld ring, or the like.

At 1904, the manufacturer may machine the weld ring and the component of the drivetrain. Machining may include cutting or otherwise forming the weld ring and drivetrain to desired specifications. For instance, component may be machined to include apertures for side gears, spider gears, or the like.

At 1906, the manufacturer may weld the weld ring with a ring gear (e.g., ring gear 150, 250, etc.). Welding may include laser welding or the like. It is noted that this ring gear may comprise a steel material that may or may not be subject to a hardening process. In an aspect, the ring gear may be pre-manufactured then provided to another party that may cast materials. In an aspect, the ring gear may comprise steel, such as a forged steel.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define embodiments disclosed herein. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A differential assembly comprising:
   a case comprising a first material;
   a weld ring comprising a second material that is different from the first material, wherein the case is overmolded onto the weld ring; and
   a ring gear coupled to the weld ring, wherein the ring gear operatively receives torque from an engine, and
   wherein the case operatively transmits torque to one or more wheels.

2. The differential assembly of claim 1, wherein the ring gear comprises a third material, wherein the third material is a different material than the first material.

3. The differential assembly of claim 2, wherein the third material is different from the second material.

4. The differential assembly of claim 2, wherein the third material comprises steel and the first material comprises ductile iron.

5. The differential assembly of claim 1, wherein the second material comprises steel and the first material comprises ductile iron.

6. The differential assembly of claim 1, further comprising a weld joint coupling the weld ring and the ring gear.

7. The differential assembly of claim 6 wherein the weld joint comprises at least one expansion area.

8. The differential assembly of claim 1, wherein the ring gear operatively couples to a drive shaft and operatively rotates relative the drive shaft.

9. The differential assembly of claim 1, wherein the engine from which the ring gear operatively receives torque is an electric engine.

10. The differential assembly of claim 1, wherein the engine from which the ring gear operatively receives torque is a gas engine.

11. A shaft of a drivetrain for providing torque to a component of the drivetrain, the shaft comprising:
    a weld ring comprising a first material;
    a shaft body comprising a second material overmolded onto the weld ring, wherein the shaft body operatively provides torque to wheels and wherein the first material is different from the second material;
    a ring gear operatively welded to the weld ring, wherein the ring gear operatively receives torque from an engine.

12. The shaft of claim 11, wherein the first material is steel and the second material is ductile iron, and wherein the shaft body is cast over the weld ring.

13. The shaft of claim 11, wherein the shaft is a differential case.

14. The shaft of claim 11, wherein the weld ring comprises an inner surface that includes at least one out-of-plane formation.

15. The shaft of claim 14, wherein the at least one out-of-plane formation engagedly secures the weld ring with the shaft body.

16. The shaft of claim 11, wherein the engine from which the ring gear operatively receives torque is an electric engine.

17. The shaft of claim 11, wherein the engine from which the ring gear operatively receives torque is a gas engine.

18. A method of manufacturing a component of a drivetrain for a vehicle comprising:
    forming teeth in a ring gear, wherein the teeth are configured to operatively receive torque from another component of the drivetrain;
    overmolding a weld ring formed of a first material that comprises steel having a carbon equivalent of less than 0.4% with a case that comprises a second material that is different from the first material;
    operatively welding a ring gear to the weld ring.

19. The method of claim 18, wherein welding comprises laser welding the weld ring to the ring gear.

20. The method of claim 18, wherein welding comprises at least one of axially or radially welding the ring gear to the weld ring.

21. The method of claim 18, further comprising machining the weld ring and the case after the overmolding and prior to the welding.

22. The method of claim 18, further comprising machining the weld ring prior to the overmolding.

23. The method of claim 18, further comprising hardening the teeth of the ring gear.

24. The method of claim 18, wherein the second material comprises any of nodular, ductile iron, gray cast iron, compacted graphite iron and non-ferrous material that incur cracking while being welded to the ring gear.

25. The method of claim 24, wherein welding comprises laser welding the weld ring to the ring gear.

26. The method of claim 24, wherein welding comprises at least one of axially or radially welding the ring gear to the weld ring.

27. The method of claim 24, further comprising machining the weld ring and the case after the overmolding and prior to the welding.

28. The method of claim 24, further comprising machining the weld ring prior to the overmolding.

29. The method of claim 24, further comprising hardening the teeth of the ring gear.

30. The method of claim 24, wherein the another component of the drivetrain comprises an electric engine.

31. The method of claim 24, wherein the another component of the drivetrain comprises a gas engine.

* * * * *